W. GUILDNER.
ICE CUTTING MACHINE.
APPLICATION FILED JUNE 6, 1919.

1,323,183.

Patented Nov. 25, 1919.

Witnesses
J. H. Crawford

Inventor
Walter Guildner,
By Victor J. Evans
Attorney

UNITED STATES PATENT OFFICE.

WALTER GUILDNER, OF KILBOURN, WISCONSIN.

ICE-CUTTING MACHINE.

1,323,183. Specification of Letters Patent. Patented Nov. 25, 1919.

Application filed June 6, 1919. Serial No. 302,132.

*To all whom it may concern:*

Be it known that I, WALTER GUILDNER, a citizen of the United States, residing at Kilbourn, in the county of Columbia and State of Wisconsin, have invented new and useful Improvements in Ice - Cutting Machines, of which the following is a specification.

This invention relates to ice cutting machines, embodying one or more saws for cutting the ice into strips or blocks.

One of the objects of the invention is the provision of a novel construction of means for elevating the saw, subsequent to the cutting operation, to permit the machine to be conveniently moved to another location for a second operation.

Another object of the invention is to provide the machine with an adjustable gage adapted to travel in the cut made in the ice by the saw, so that the machine will travel over a prescribed course to cut strips or blocks of ice of a predetermined size.

The nature and advantages of the invention will be readily apparent when the following detailed description is read in connection with the accompanying drawings, the invention residing in the construction, combination and arrangement of parts as claimed.

In the drawings forming part of the specification, like numerals of reference indicate similar parts in the several views, and wherein:—

Figure 1:
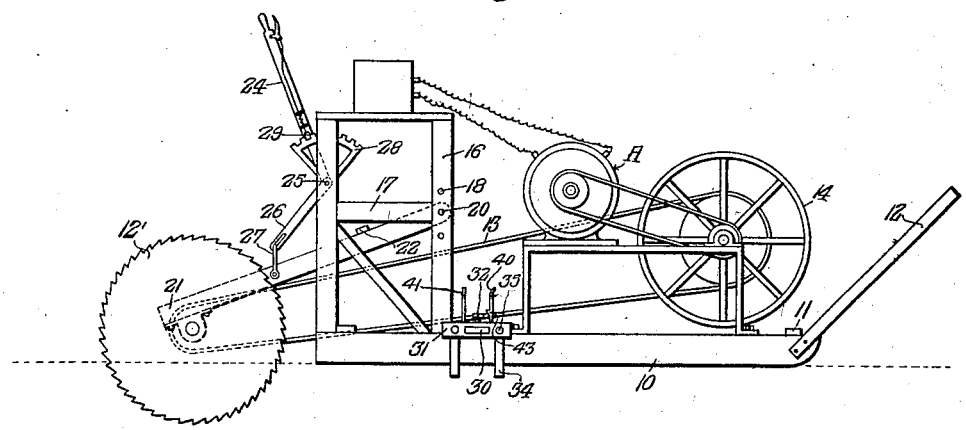
Figure 1 is a side elevation of the machine showing the saw lowered to a position for use.

Referring more particularly to the drawings in detail 10 indicates a pair of runners which are suitably connected and braced by means of the transversely disposed elements 11, a handle 12 being provided for moving the machine over the surface. Mounted upon the runners in any suitable manner is a motor indicated generally at A, which may be an electric motor as shown or any other suitable type utilized for operating the saw 12. An endless belt 13 is trained over the axis of the saw as shown, and also over the fly wheel 14 for this purpose. A frame including the upright members 16 is mounted upon the runners 10 adjacent the rear end thereof, the members 16 being connected and suitably braced by the transversely disposed members 17. One pair of the uprights 16 is provided with a plurality of openings 18, the opening in the element 16 being alined to receive the transversely disposed shaft or rod 20. Pivotally mounted upon this rod 20 are the arms 21 which support the saw 12', the arms 21 being connected by means of a transverse reinforcing element 22. The rod 20 is susceptible of vertical adjustment upon the uprights 16, to regulate the depth of the cut made by the saw.

Figure 2:
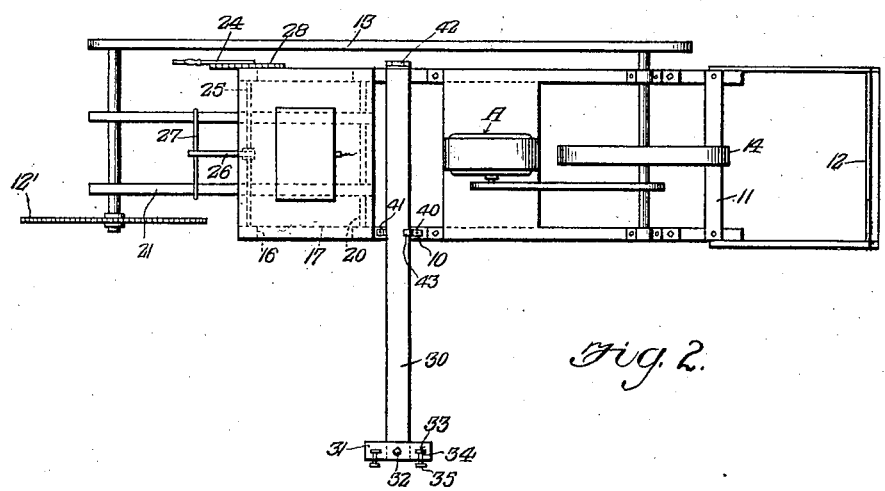
Fig. 2 is a top plan view.
Figure 3:
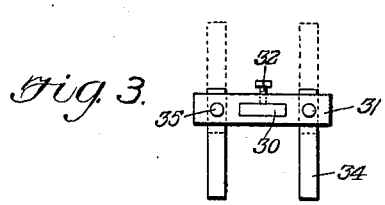
Fig. 3 is a detail view of the adjustable gage showing the inactive position of the fingers by dotted lines.

For the purpose of elevating the saw 12' when it is desired to move the machine over the surface, I provide a lever 24 pivoted upon the frame as at 25, the lever having an offset extremity 26 to which are swingingly connected the extremities of a yoke 27 which receives and supports the arms 21. A toothed segment 28 is fixed upon the frame, and a pawl 29 carried by the lever is adapted to engage the teeth of the segment to hold the saw in elevated position. The arrangement of the lever and the elevated position of the saw is clearly indicated in Fig. 2.

Arranged transversely of the runners 10 is a strip 30, the latter projecting an appreciable distance beyond one side of the machine and constituting a part of the gage utilized for guiding the machine, so that strips or blocks of predetermined size may be cut. A block 31 has an opening for the reception of the strip 30, the block being slidably mounted upon the latter and held fixed relatively thereto in any given position by means of a set screw 32. The block 31 is further provided with vertically disposed slots 33 at opposite sides of the strip 30, and through said slots are passed the fingers 34 which project an appreciable distance below the block 31 to travel in the cut made by the saw, and thus guide the machine in its travel. The fingers 34 are susceptible of vertical adjustment, but are held fixed in a given position by means of set screws 35. By loosening the set screw 35, the fingers 34 may be elevated so that the lower extremities thereof lie flush with the bottom or undersurface of the block 31, to permit the machine to be conveniently moved over the surface when the machine is not in use, thus eliminating all possibility of the fingers becoming broken or otherwise injured. Manifestly, by adjusting the block 31 longitudinally of the strip 30 a block of ice of any desired width may be cut, and by adjusting the arms 21 vertically of the standards 16 the thickness of the block may also be regulated.

Rising from one of the runners 10 are spaced parallel resilient arms 40 and 41 respectively. These arms are spaced a distance equal to the width of the strip 30 as the latter is adapted to move between said arms and swung upon its hinge 42. The resilient arm 40 is formed to provide a shoulder 43 upon which the strip 30 rests when the latter is elevated in a manner shown in Fig. 2 thus supporting the fingers 34 in spaced relation to the ground or surface. This arrangement permits the machine to be readily and easily moved over the surface, from place to place without any possibility of the fingers becoming broken or otherwise. It is only necessary to press against the free end of the resilient arm 40 to release the strip 30 when it is desired to lower the latter into an active or operative position.

While I have shown and described what I consider the preferred embodiment of the invention, I desire to have it understood that I do not limit myself to the exact construction and arrangement of parts disclosed inasmuch as such changes may be resorted to when desired as fall within the scope of what is claimed.

What is claimed is:—

1. In an ice cutting machine comprising a portable frame, an element arranged transversely of the frame and projecting beyond one side thereof, a block slidably mounted on said element, means for holding said block in a given position, vertically disposed prongs carried by the block to travel in the cut made by the saw, said prongs being capable of vertical sliding movement, and means for holding said prongs fixed relatively to the block.

2. In an ice cutting machine comprising a portable frame, an element extended transversely of the frame and projecting beyond one side thereof, a gage carried by said element, said element being pivoted at one end, a resilient member rising from said frame, and means carried by said member for engagement with the gage carrying element for holding the latter elevated in spaced relation to the ground.

In testimony whereof I affix my signature.

WALTER GUILDNER.